US010427041B2

(12) United States Patent
Fujisawa

(10) Patent No.: US 10,427,041 B2
(45) Date of Patent: Oct. 1, 2019

(54) PROGRAM AND SYSTEM

(71) Applicant: KABUSHIKI KAISHA SQUARE ENIX, Tokyo (JP)

(72) Inventor: Jin Fujisawa, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 15/386,607

(22) Filed: Dec. 21, 2016

(65) Prior Publication Data

US 2017/0173463 A1 Jun. 22, 2017

(30) Foreign Application Priority Data

Dec. 22, 2015 (JP) .................................. 2015-250066

(51) Int. Cl.
*A63F 13/35* (2014.01)
*A63F 13/537* (2014.01)
(Continued)

(52) U.S. Cl.
CPC .............. *A63F 13/35* (2014.09); *A63F 13/46* (2014.09); *A63F 13/537* (2014.09); *A63F 13/69* (2014.09); *A63F 13/798* (2014.09); *A63F 13/95* (2014.09)

(58) Field of Classification Search
CPC ....................... A63F 13/357; A63F 3/02; A63F 2003/00996; A63F 2001/0475
See application file for complete search history.

(56) References Cited

U.S. PATENT DOCUMENTS 5,662,332 A * 9/1997 Garfield .................... A63F 1/00
273/308
RE37,957 E * 1/2003 Garfield .................... A63F 1/00
273/259
(Continued)

FOREIGN PATENT DOCUMENTS

JP 2001-353373 12/2001
JP 2002-263369 9/2002
(Continued)

OTHER PUBLICATIONS

"Question about party experience sharing." Diabloii.net. May 26, 2010. Accessed Apr. 26, 2018. <https://www.diabloii.net/forums/threads/question-about-party-experience-sharing.767893/>.*
(Continued)

*Primary Examiner* — William H McCulloch, Jr.
(74) *Attorney, Agent, or Firm* — Greenblum & Bernstein, P.L.C.

(57) ABSTRACT

A non-transitory computer-readable medium including a program product for causing a user terminal to realize functions to control progress of a video game is provided. The functions include: a specifying function configured to specify an event in the video game, a set, and a basic privilege, the set being constituted by a plurality of game elements, the basic privilege being given in accordance with progress of the event using the set. The functions also include: a distributing function configured to distribute the basic privilege to the plurality of game elements in accordance with a ratio of a parameter set up to each of the plurality of game elements to a total of the parameters respectively set up to the plurality of game elements.

9 Claims, 9 Drawing Sheets

(51) Int. Cl.
*A63F 13/95* (2014.01)
*A63F 13/69* (2014.01)
*A63F 13/46* (2014.01)
*A63F 13/798* (2014.01)

(56) References Cited

U.S. PATENT DOCUMENTS

| | | | | |
|---|---|---|---|---|
| 7,402,105 | B1* | 7/2008 | Hutter | A63F 13/12 434/128 |
| 7,993,201 | B2* | 8/2011 | Matsumoto | A63F 13/42 345/173 |
| 8,523,648 | B2* | 9/2013 | Gilson | A63F 1/00 273/236 |
| 9,975,051 | B2* | 5/2018 | Chudley | A63F 13/55 |
| 10,286,317 | B2* | 5/2019 | Fujisawa | A63F 13/35 |
| 2005/0182693 | A1* | 8/2005 | Alivandi | A63F 13/12 705/26.5 |
| 2010/0216553 | A1* | 8/2010 | Chudley | A63F 13/55 463/42 |
| 2010/0261519 | A1* | 10/2010 | Zapata | A63F 1/04 463/22 |
| 2012/0142429 | A1* | 6/2012 | Muller | A63F 13/35 463/42 |
| 2013/0344964 | A1* | 12/2013 | Sloan | A63F 13/5375 463/42 |
| 2014/0004920 | A1* | 1/2014 | Tagawa | A63F 13/12 463/16 |
| 2014/0128156 | A1* | 5/2014 | Morioka | A63F 13/10 463/29 |
| 2014/0243095 | A1* | 8/2014 | Ikeda | A63F 13/12 463/42 |
| 2014/0295937 | A1* | 10/2014 | Takahashi | G07F 17/326 463/20 |
| 2014/0357339 | A1* | 12/2014 | Urushihara | G07F 17/329 463/17 |
| 2014/0364194 | A1* | 12/2014 | Kusano | A63F 13/35 463/22 |
| 2016/0107090 | A1* | 4/2016 | Yonekura | G07F 17/32 705/39 |
| 2016/0121218 | A1* | 5/2016 | Allen | A63F 13/67 463/31 |
| 2017/0173463 | A1* | 6/2017 | Fujisawa | A63F 13/35 |
| 2017/0173469 | A1* | 6/2017 | Fujisawa | A63F 13/35 |

FOREIGN PATENT DOCUMENTS

| | | |
|---|---|---|
| JP | 2006-014952 | 1/2006 |
| JP | 2006-026237 | 2/2006 |
| JP | 2015-008735 | 1/2015 |

OTHER PUBLICATIONS

"Diablo II—Wikipedia, the free encyclopedia." WayBackMachine capture Feb. 8, 2012. Accessed Apr. 26, 2018. <https://web.archive.org/web/20120208123246/https://en.wikipedia.org/wiki/Diablo_II>.*

Office Action from Japan Patent Office (JPO) in Japanese Patent Appl. No. 2015-250066, dated Dec. 27, 2016, together with a partial English language translation.

"Online RPG Lineage The Cross Rancor Episode VI The Lastavard—Inevitable Destiny-Master Book the 1st Vol.", KOEI Co., Ltd., First Edition, p. 19 (Sep. 5, 2007), together with a partial English language translation.

Office Action from Japan Patent Office (JPO) in Japanese Patent Appl. No. 2015-250066, dated May 23, 2017, together with a partial English language translation.

"BaseLv and JobLv", Ragnarok Online Official Guidebook 2009 the 1st Vol., SB Creative Corp., Jul. 30, 2009, First Edition, p. 165.

"Terra Battle", Weekly Famistu, Kadokawa Corp., Feb. 12, 2015, vol. 30, No. 9, p. 168-169.

Office Action from Japan Patent Office (JPO) in Japanese Patent Appl. No. 2015-250066, dated Jan. 30, 2018, together with a partial English language translation.

Silo, "Dragon Quest X—Silo's Adventure Diary", available at http://hiroba.dqx.jp/sc/diary/521058333101/view/2570371 (Nov. 19, 2014).

* cited by examiner

PROGRAM AND SYSTEM

CROSS-REFERENCE TO RELATED APPLICATION

The present application relates to subject matter contained in Japanese Patent Application No. 2015-250066 field on Dec. 22, 2015, the disclosure of which is expressly incorporated herein by reference in its entirety.

BACKGROUND OF THE INVENTION

1. Field of the Invention

At least one of embodiments according to the present invention relates to a program and a system for causing a computer to realize functions to control progress of a video game.

2. Description of the Related Art

In a conventional system, there is a game system in which a privilege such as an experience value is given to a character that participates in a video game.

In such a system, for example, there is a game system in which a difference is provided without uniformly giving a privilege to characters, to which the privilege is to be given, by determining an experience value set up to each of the characters (that is, a quantity or the number of privilege) on the basis of an evaluation point obtained by each of the characters (see Japanese Patent Application Publication No. 2001-353373).

However, in the conventional game system, the evaluation point that can be obtained is determined in accordance with the play content. For this reason, the quantity or the number of privilege that one character can obtain easily receives an influence of the play content compared with the quantity or the number of privilege that other character can obtain, to which the privilege is given. Therefore, there has been a problem that a user loses interest in the video game because a character that hardly obtain an evaluation point becomes disadvantageous. Namely, further improvement is required in such a game system.

SUMMARY OF THE INVENTION

It is an object of at least one of embodiments according to the present invention to solve the problem described above, and to improve interest of a video game using an event.

According to one non-limiting aspect of the present invention, there is provided a non-transitory computer-readable medium including a program product for causing a user terminal to realize functions to control progress of a video game.

The functions include a specifying function configured to specify an event in the video game, a set, and a basic privilege, the set being constituted by a plurality of game elements, the basic privilege being given in accordance with progress of the event using the set.

The functions also include a distributing function configured to distribute the basic privilege to the plurality of game elements in accordance with a ratio of a parameter set up to each of the plurality of game elements to a total of the parameters respectively set up to the plurality of game elements.

According to another non-limiting aspect of the present invention, there is provided a system including a communication network, a server, and a user terminal.

The system includes a specifying section configured to specify an event in the video game, a set, and a basic privilege, the set being constituted by a plurality of game elements, the basic privilege being given in accordance with progress of the event using the set.

The system also includes a distributing section configured to distribute the basic privilege to the plurality of game elements in accordance with a ratio of a parameter set up to each of the plurality of game elements to a total of the parameters respectively set up to the plurality of game elements.

According to still another non-limiting aspect of one embodiment according to the present invention, there is provided a non-transitory computer-readable medium including a program product for causing a server to realize functions to control progress of a video game.

The functions include a specifying function configured to specify an event in the video game, a set, and a basic privilege, the set being constituted by a plurality of game elements, the basic privilege being given in accordance with progress of the event using the set.

The functions also include a distributing function configured to distribute the basic privilege to the plurality of game elements in accordance with a ratio of a parameter set up to each of the plurality of game elements to a total of the parameters respectively set up to the plurality of game elements.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

First Embodiment

Figure 1:
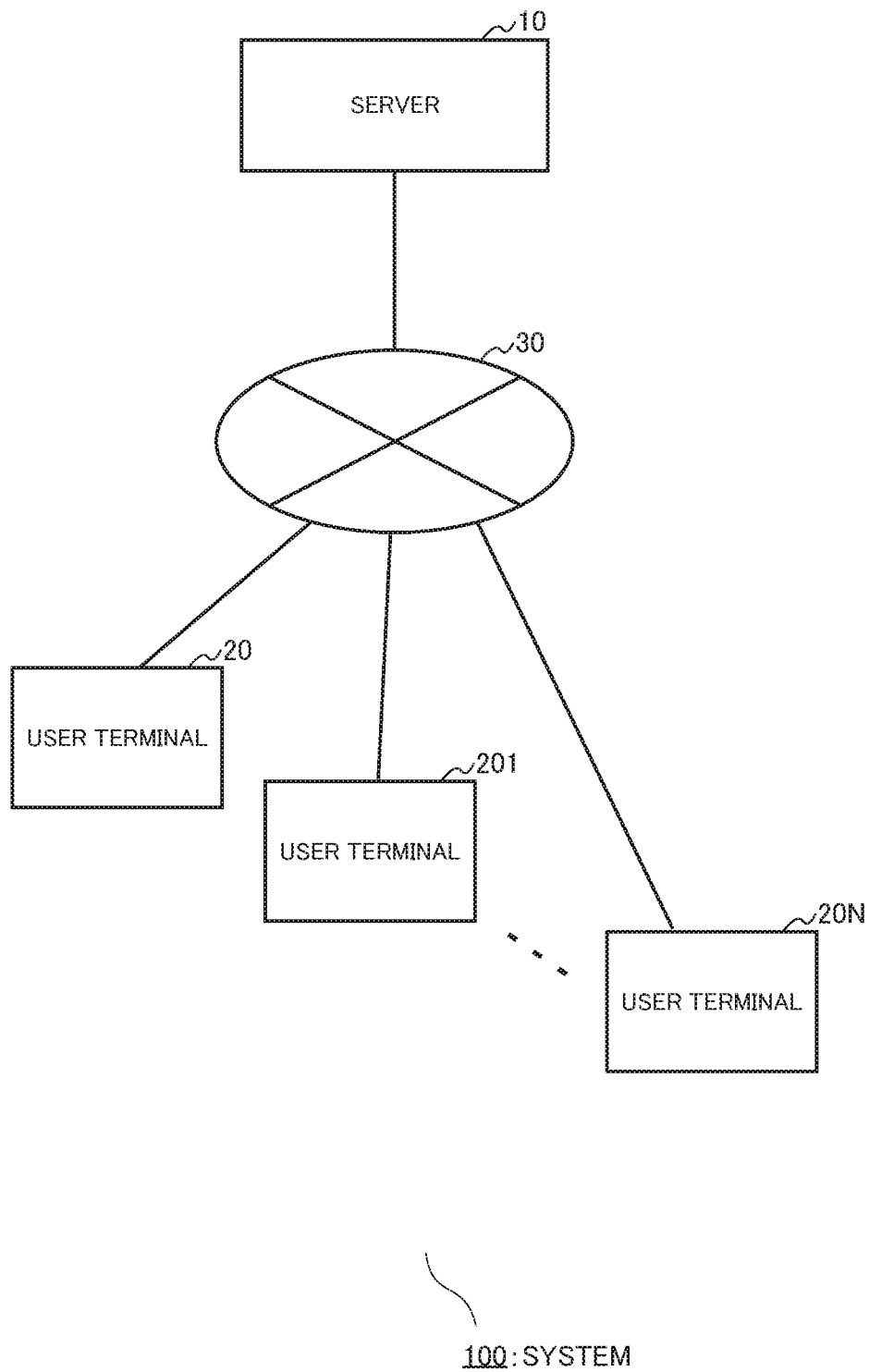
FIG. 1 is a block diagram showing an example of a configuration of a system corresponding to at least one of embodiments according to the present invention.

FIG. 1 is a block diagram showing an example of a configuration of a system 100 according to one embodiment of the present invention. As shown in FIG. 1, the system 100 includes a server 10 and a plurality of user terminals 20 and 201 to 20N ("N" is an arbitrary integer), each of which is used by a user of the system. In this regard, a configuration of the system 100 is not limited to this configuration. The system 100 may be configured so that a plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10 and the plurality of user terminals 20, 201 to 20N, whereby various kinds of functions for carrying out various kinds of processes in response to an operation of the user are realized.

The server 10 is managed by an administrator of the system 100, and has various kinds of functions to provide information regarding the various kinds of processes to the plurality of user terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section and a communicating section, as a computer. However, its explanation herein is omitted. Further, in the system 100, it is preferable that the server 10 manages various kinds of information from a point of view to reduce a processing load on each of the plurality of user terminals 20, 201 to 20N. However, a storage region may be provided in a state that the server 10 can access the storage region. For example, the server 10 may be configured so as to be provided with a dedicated storage region outside the server 10.

Figure 2:
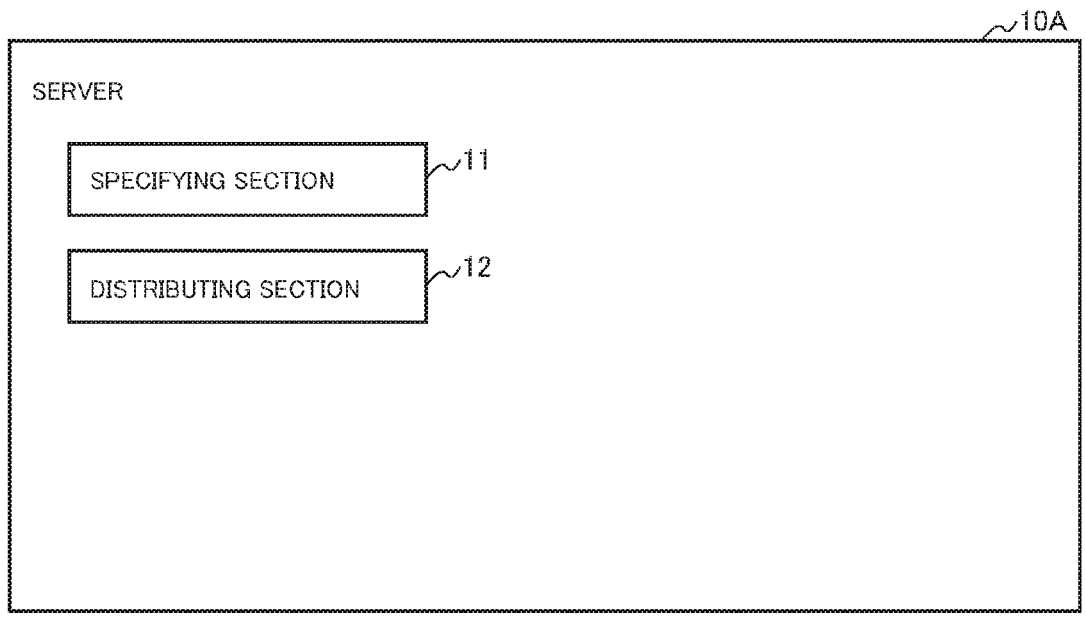
FIG. 2 is a block diagram showing a configuration of a server corresponding to at least one of the embodiments according to the present invention.

FIG. 2 is a block diagram showing a configuration of a server 10A that is an example of the configuration of the server 10. As shown in FIG. 2, the server 10A at least includes a specifying section 11, and a distributing section 12.

The specifying section 11 has a function to specify an event in a video game, a set constituted by a plurality of game elements, and a basic privilege that is given to the user in accordance with progress of the event using the set. In the present embodiment, the specifying section 11 refers to a predetermined storage region in which an event, a set and a basic privilege are stored so as to be associated with each other, and specifies an event or the like according to progress of the video game. In this regard, the configuration to specify the event or the like is not limited to the configuration according to the present embodiment. However, it is preferable that the set to be specified is configured so as to include game elements owned by the user. In this regard, timing to specify the event or the like in order to distribute the basic privilege is not limited particularly. However, the timing may be the time to start the event, or the time after the event is carried out.

Here, the "event" means an event or occurrence that can occur in the video game. The configuration of the event is not limited particularly. However, it is preferable that it is a configuration in which a game element is used by the user and the user side and other party side are included therein. As an example of the event, there is a fight that is carried out in the video game by the user and the other party side.

Further, the "fight" is game content in which the game element is caused to fight against an enemy character on the basis of a program product stored in a predetermined storage region. As one example of the "fight", there are a battle and the like.

Further, the "game element" means a virtual card or an item that a player can obtain in the video game. As examples of the "game elements", there are a virtual card and equipment with which character information is associated, and the like. Various kinds of parameters are set up to the character information.

Further, the "set" means a group of game elements constituted by at least one game element. As examples of the "set", there are a "deck", a "party" and the like.

Further, the word "progress of the event" means occurrence of various kinds of progress or changes and the like that can be generated in the event. As examples of the phrase "occurrence of various kinds of progress or changes and the like that can be generated in the event", there are progress of time, a change in a parameter of a game element, update of a specific status or a flag, or an operational input by the user, and the like.

Further, the phrase "given in accordance with progress of the event" means that a basic privilege is given in conjunction with a situation that an event is proceeding. As examples of the configuration "given in accordance with progress of the event", there are a configuration in which the basic privilege is given in accordance with a result of the event (victory or defeat), a configuration in which the basic privilege is given in accordance with an achievement speed of the event, and a configuration in which the basic privilege is given in accordance with an achievement degree of the event. The "privilege to be given" herein is different from a privilege to be given (or distributed) to each character that obtains the privilege, and is one that becomes a basis for distributing to each of the game elements. Namely, in a case where the basic privilege is small, a privilege to be given to each of the game elements becomes small totally. Further, in a case where the basic privilege is large, a privilege to be given to each of the game elements becomes large totally. Therefore, advantage or disadvantage based on influence of the play content of the event does not occur among the game elements to which the privilege is given.

Further, the "basic privilege" means a privilege that is defined in advance. Here, the "privilege" means a benefit that is given particularly. As an example of the "privilege", there is an experience value. In this regard, it is preferable that the "basic privilege" is configured so as to be given in accordance with the result of the event.

The distributing section 12 has a function to distribute the basic privilege to each of the plurality of game elements in accordance with a ratio of a parameter set up to each of the plurality of game elements to a total of the parameters respectively set up to the plurality of game elements.

Here, the word "distribute" means to divide and deliver. Namely, the distributing section 12 has a function to divide and deliver the basic privilege to each of the game elements constituting the set.

Further, the "parameter" means a value that varies in accordance with setting. As examples of the "parameter", there are an offensive power, an HP, a defensive power and the like as a value that is calculated from a level value and a characteristic of a character.

Further, the phrase "in accordance with a ratio" means that a privilege to be finally distributed may be distributed in accordance with the ratio. It is not required to be determined by the "ratio" itself. Namely, as the configuration of the phrase "in accordance with a ratio", the distributing section 12 may be configured so that the higher the ratio of the parameter for the game element is, the lower the distribution factor thereof becomes, for example. In this regard, it is preferable that the system 100 is configured so that a predetermined calculating formula for calculating a final distribution factor is stored in a predetermined storage region.

Therefore, for example, in a case where the level value is used as the parameter and the distributing section 12 distributes an experience value of "1000" to a set constituted by a game element A having a level value of "40" and a game element B having a level value of "60", a total of the level values of the set becomes "100", and a ratio between those of the game element A and the game element B becomes "4 versus 6". For this reason, the experience value of "1000" (that is, the basic privilege) is distributed by "4 versus 6". Therefore, in this example, the experience value of 400 is given to the game element A, and the experience value of 600 is given to the game element B.

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type game, for example. In this regard, a configuration of the user terminal that the system 100 can include is not limited to the examples described above. It may be a configuration in which the user can recognize the video game. As other examples of the user terminal, there are a combination of various kinds of communication terminals, a personal computer, and a stationary game device.

Further, each of the plurality of user terminals 20, 201 to 20N is connected to the communication network 30, and includes hardware (for example, a display device for displaying a game image) and software for carrying out various kinds of processing by communicating with the server 10. In this regard, each of the plurality of user terminals 20, 201 to 20N may be configured so as to be capable of directly communicating with each other without the server 10.

Next, an operation of the system 100 according to the present embodiment will be described.

Figure 3:
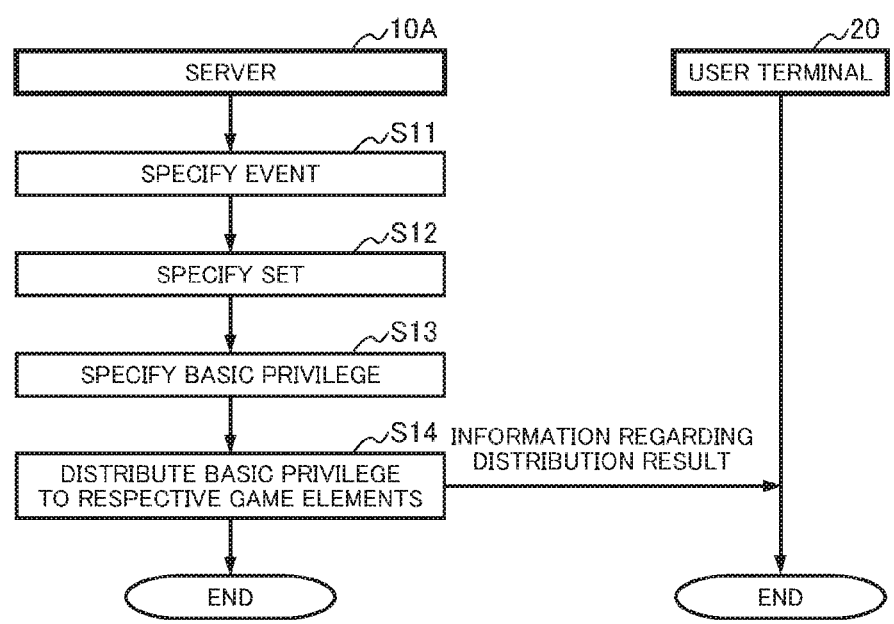
FIG. 3 is a flowchart showing an example of output processing corresponding to at least one of the embodiments according to the present invention.

FIG. 3 is a flowchart showing an example of processing regarding the video game, which is carried out by the system 100 (hereinafter, referred to as "game related processing"). In the game related processing according to the present embodiment, a process to distribute a privilege is carried out. Hereinafter, the case where the server 10A and the user terminal 20 (hereinafter, referred to as a "terminal 20") carry out the game related processing will be described as an example.

For example, the game related processing is started when an event carried out by the user is terminated.

In the game related processing, the server 10A first specifies an event (Step S11). For example, the server 10A refers to information regarding the user of the terminal 20, and specifies the event that was carried out in the terminal 20.

Subsequently, the server 10A specifies a set used for the event (Step S12). For example, the server 10A refers to the information regarding the user of the terminal 20, and specifies the set used for the event.

Subsequently, the server 10A specifies a basic privilege to be given in accordance with progress of the event (Step S13). For example, the server 10A refers to information stored in a predetermined storage region, and specifies the basic privilege that is associated with the event.

When the various kinds of information are specified, the server 10A distributes the basic privilege to each of a plurality of game elements in accordance with a ratio of a parameter set up to each of the plurality of game elements to a total of the parameters respectively set up to the plurality of game elements (Step S14). For example, the server 10A specifies a parameter for each of the game elements; calculates a total of the specified parameters; calculates a ratio of the parameter of each of the game element to the total parameters; and determines a privilege to be given to each of the game elements by referring to a predetermined calculating formula in accordance with the basic privilege and the ratio.

When the basic privilege is distributed, the server 10A terminates the processing therein.

Figure 4:
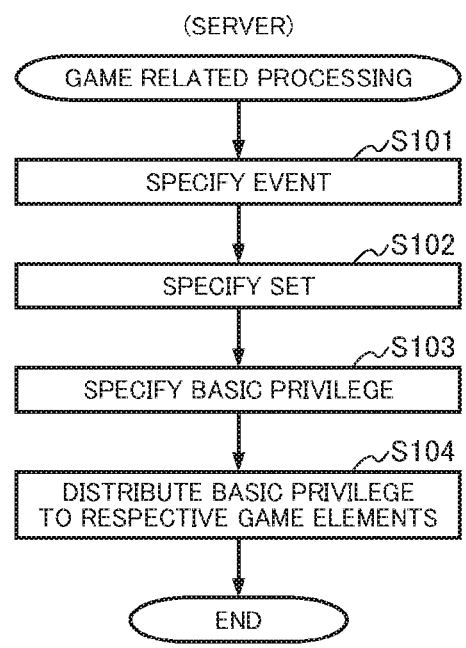
FIG. 4 is a flowchart showing an example of an operation of a server side in the output processing corresponding to at least one of the embodiments according to the present invention.

FIG. 4 is a flowchart showing an example of an operation at the server 10A side in the game related processing. Here, an operation of the server 10A in the system 100 will be described again.

In the game related processing, the server 10A first specifies an event (Step S101); specifies a set used in the event (Step S102); specifies a basic privilege to be given in accordance with progress of the event (Step S103); and distributes the basic privilege to each of a plurality of game elements in accordance with a ratio of the parameter set up to each of the plurality of game elements to a total of the parameters respectively set up to the plurality of game elements (Step S104). It has not been mentioned particularly in the present embodiment. However, it is preferable that the server 10A carries out a process to cause the display device to display an image for causing the user to recognize a distribution result. For example, the server 10A generates image information for displaying the image for causing the user to recognize the distribution result, and transmits the generated image information to the terminal 20.

Figure 5:
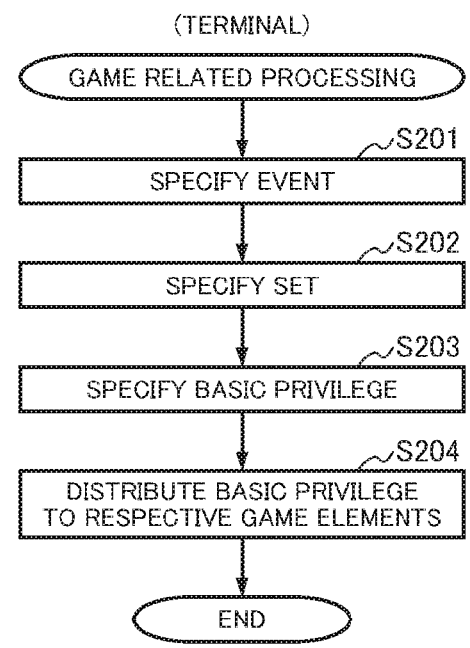
FIG. 5 is flowchart showing an example of an operation of a terminal side in the output processing corresponding to at least one of the embodiments according to the present invention.

FIG. 5 is a flowchart showing an example of an operation of the terminal 20 side in a case where the terminal 20 carries out the game related processing. Hereinafter, the case where the terminal 20 carries out the game related processing by a single body will be described as an example. In this regard, the terminal 20 is configured so as to include the similar functions to those of the server 10 except for reception of various kinds of information from the server 10. For this reason, its description is omitted from a point of view to avoid repeated explanation.

In the game related processing, the terminal 20 first specifies an event (Step S201); specifies a set used in the event (Step S202); specifies a basic privilege to be given in accordance with progress of the event (Step S203); and distributes the basic privilege to each of a plurality of game elements in accordance with a ratio of a parameter set up to each of the plurality of game elements to a total of the parameters respectively set up to the plurality of game elements (Step S204).

As explained above, as one side of the first embodiment, the server 10A that controls progress of the video game is configured so as to include the specifying section 11 and the distributing section 12. Thus, the event in the video game, the set constituted by the plurality of game elements, and the basic privilege to be given in accordance with progress of the event using the set are specified; and the basic privilege is distributed to each of the plurality of game elements in accordance with the ratio of the parameter set up to each of the plurality of game elements to the total of the parameters respectively set up to the plurality of game elements. Therefore, it is possible to improve interest of the user in a video game using an event.

Namely, as one side of the first embodiment, it becomes possible to distribute the privilege of the event to the respective game elements in accordance with the parameter of each of the game elements used in the event. For this reason, it is possible to improve interest of the user in the video game compared with conventional ones.

In this regard, it has not been mentioned particularly in the example of the first embodiment. However, the server 10A may be configured so as to cause the display device to display the image by which the user is caused to recognize information regarding the distribution result. In this case, for example, the server 10A may be configured so as to: generate information for causing the user terminal to display a game screen, which includes regions for displaying the content of the basic privilege and the privilege distributed to each of the game elements; and transmit the generated information to the user terminal.

Second Embodiment

Figure 6:
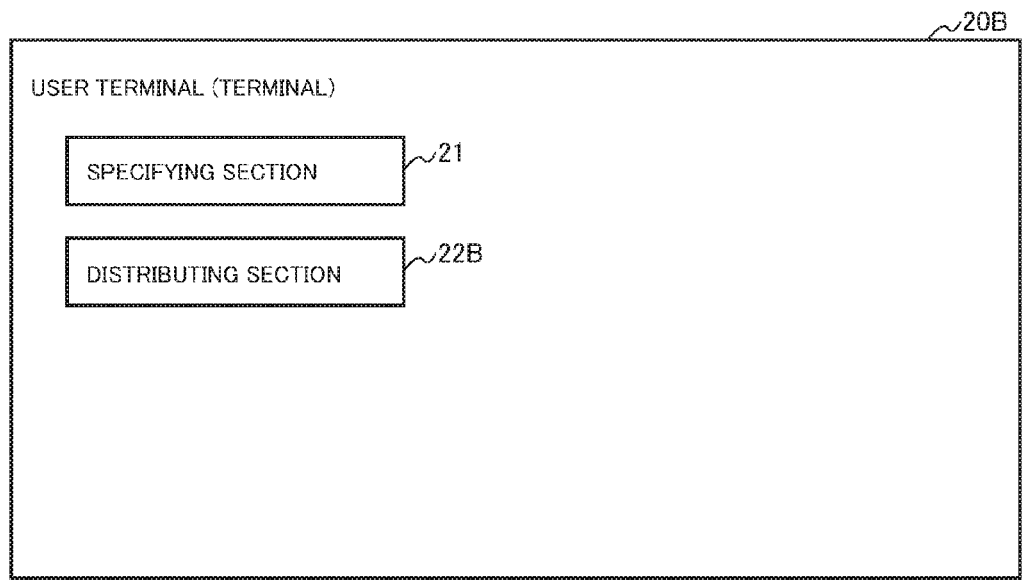
FIG. 6 is a block diagram showing a configuration of a user terminal corresponding to at least one of the embodiments according to the present invention.

FIG. 6 is a block diagram showing a configuration of a user terminal 20B (hereinafter, referred to as a "terminal 20B"), which is an example of the user terminal 20. In the present embodiment, the terminal 20B at least includes a specifying section 21 and a distributing section 22B.

The distributing section 22B has a function to distribute a basic privilege so that in comparison of parameters for a plurality of game elements, a distribution factor of a game element having a higher parameter becomes higher compared with a game element having a lower parameter. It is preferable that the "parameters" are configured so that a difference of elevation is generated in the respective game elements like the level value.

Here, the word "the plurality of game elements" means game elements that have a common relationship each other. The "common relationship" herein is a relationship to constitute a set.

Here, the "distribution factor" means a ratio with respect to a whole when to be distributed. More specifically, in a case where "10" is given when to distribute "100", a distribution factor becomes 10%.

Figure 7:
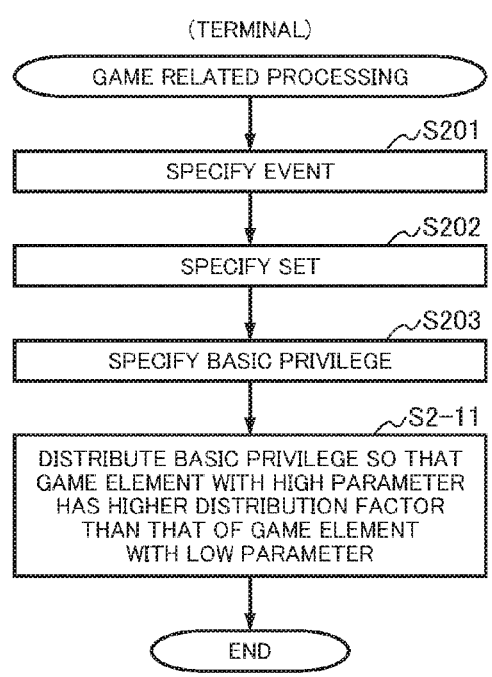
FIG. 7 is a flowchart showing an example of the output processing corresponding to at least one of the embodiments according to the present invention.

FIG. 7 is a flowchart showing an example of the game related processing carried out by the terminal 20. Hereinafter, an operation of the terminal 20B will be described as an example. In this regard, an operation of the terminal 20B together with the server 10 is omitted from a point of view to avoid repeated explanation.

When the basic privilege given in accordance with progress of an event is specified (Step S203), the terminal 20B distributes a basic privilege so that in comparison of the parameters for the plurality of game elements, a distribution factor of a game element having a higher parameter becomes higher compared with a game element having a lower parameter (Step S2-11). For example, the terminal 20B refers to a coefficient when to distribute, which is defined so that a distribution factor of a game element having a higher parameter becomes higher compared with a game element having a lower parameter; determines a distribution factor of each of the game elements; and distributes the privilege to each of the game elements in accordance with the determined distribution factor.

As explained above, as one side of the second embodiment, the user terminal 20B is configured so as to include the specifying section 21 and the distributing section 22B. Thus, in comparison of the parameters for the plurality of game elements, the basic privilege is distributed so that the distribution factor of a game element having a higher parameter becomes higher compared with a game element having a lower parameter. Therefore, it is possible to prompt the user who constitutes a set to consider the parameter among the game elements.

Third Embodiment

Figure 8:
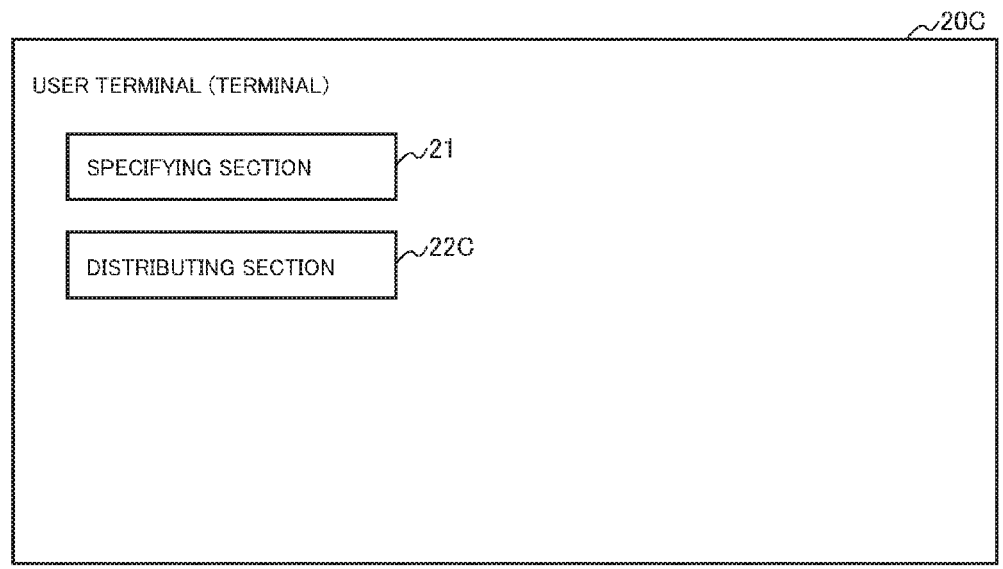
FIG. 8 is a block diagram showing a configuration of the user terminal corresponding to at least one of the embodiments according to the present invention.

FIG. 8 is a block diagram showing a configuration of a user terminal 20C (hereinafter, referred to as a "terminal 20C"), which is an example of the user terminal 20. In the present embodiment, the terminal 20C at least includes a specifying section 21 and a distributing section 22C.

In the present embodiment, the terminal 20C is configured so that a privilege is an experience value. Further, the terminal 20C is also configured so that a basic privilege is a basic experience value.

Here, the "experience value" is a value that is accumulated in a game element, and means a value that may influence on a parameter of the game element in accordance with an accumulated number. Namely, the experience value given to the game element is accumulated in the game element.

The distributing section 22C has a function to calculate the experience value to be distributed to one game element contained in a set in accordance with a formula (I) as follows:

[Experience value distributed to one game element]=
[Basic experience value]×[Parameter of one game element]/[Total value of parameters respectively set up to a plurality of game elements].

Further, the distributing section 22C has a function to give the calculated experience value to one game element.

Figure 9:
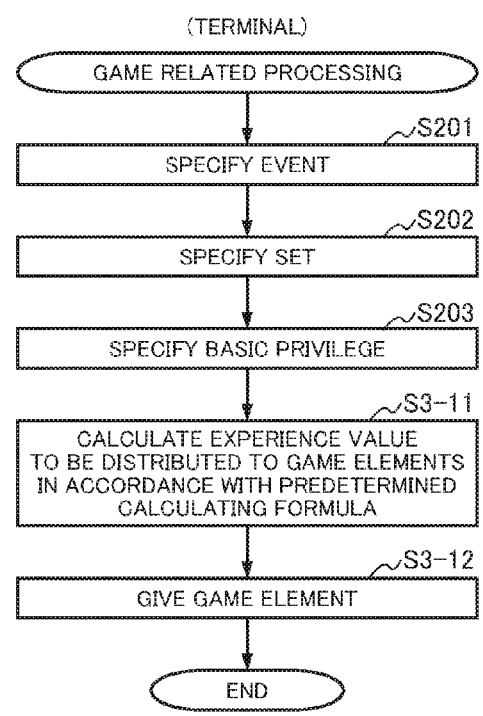
FIG. 9 is a flowchart showing an example of the output processing corresponding to at least one of the embodiments according to the present invention.

FIG. 9 is a flowchart showing an example of the game related processing carried out by the terminal 20. Hereinafter, an operation of the terminal 20C described as an example. In this regard, an operation of the terminal 20C with the server 10 is omitted from a point of view to avoid repeated explanation.

When the basic privilege given in accordance with progress of an event is specified (Step S204), the terminal 20C calculates the experience value to be distributed to one game element in accordance with the formula (I) (Step S3-11). For example, in a case where the basic experience value is "1000", the parameter of the one game element is "10" and the total value of the parameters respectively set up to the plurality of game elements is "100", the terminal 20C calculates the experience value to be distributed to the one game element as "100" in accordance with the formula as follows:

[Experience value distribute to one game element]=
[1000]×[10]/[100]=100.

When the experience value distributed to the one game element is calculated, the terminal 20C gives the calculated experience value to the one game element (Step S3-12), and terminates the processing therein.

As explained above, as one side of the third embodiment, the user terminal 20C is configured so as to include the specifying section 21 and the distributing section 22C. Thus, the experience value to be distributed to one game element is calculated in accordance with the formula (I), and the calculated experience value is given to the one game element. Therefore, it is possible to improve interest of the user in a video game using an event.

In this regard, it has not been mentioned particularly in the example of the third embodiment. However, the user terminal 20C may be configured so as to: give the calculated experience value to the game element that satisfies a predetermined condition of the game elements used in the event in accordance with the formula (I); and equally distribute a value obtained by subtracting the given game element from the basic experience value to each of the game elements that do not satisfy the predetermined condition. In this case, for example, specification by the user may be used as the predetermined condition. By configuring the user terminal 20C in this manner, it is possible to prompt the user who constitutes the set to devise its manner.

Fourth Embodiment

In a fourth embodiment, an example of a video game in the present system will be described in detail.

(Outline of Video Game)

A video game according to the present embodiment is one in which a deck including at least one game element (that is, an arcana) that is owned by a user is organized, and a battle (or a fight) against an enemy character is then carried out as an event. When various kinds of events are displayed on a display screen of a user terminal and the user carries out a selection operation for an event, an enemy character corresponding to the event is displayed. The user carries out a battle against the enemy character by organizing a deck.

(Outline of Arcana and Enemy Character)

Each of game elements owned by the user is referred to as an "arcana". A parameter is set up to each of the arcanas. A level value, an offensive power, a defensive power, an HP, and the like are contained in the parameter of the arcana. Similarly, a parameter is also set up to an enemy character. A level value, an offensive power, a defensive power, an HP, and the like are also contained in the parameter of the enemy character. Further, various kinds of parameters such as a preperceptive power (or a predictive power) is setup to a user character itself in addition to the arcanas constituting the deck. Hereinafter, in order to clearly distinguish them, explanation will be made by using the user, the user character, the arcana, and the enemy character differently.

(Flow of Battle)

As a flow of a battle, the user first selects an event. An enemy character corresponding to the selected event appears and is displayed on a display screen. After the enemy character is displayed, an image in which a plurality of arcanas owned by the user is selected to organize a deck is displayed on the display screen. When the deck is determined by an input of the user, an event (here, a fight against the enemy character) is started. The battle is a turn-by-turn battle. One round is constituted by a turn of the user (that is, a user phase) and a turn of the enemy character (that is, an enemy phase). Namely, the round means a breakpoint or a separation of offense and defense between a fiend and an enemy in the event. The rounds are repeated, and the battle is terminated finally. In the round, the user terminal refers to parameters for the characters to determine an action order of the arcana and the enemy character. In a case where the HP of the enemy character becomes "0 (zero)", the battle is terminated as victory of the user. On the other hand, in a case where all HPs of the arcanas of the user side become "0" before the HP of the enemy character becomes "0", the battle (that is, the fight) is terminated as defeat of the user.

(Configuration of Deck)

Figure 10:
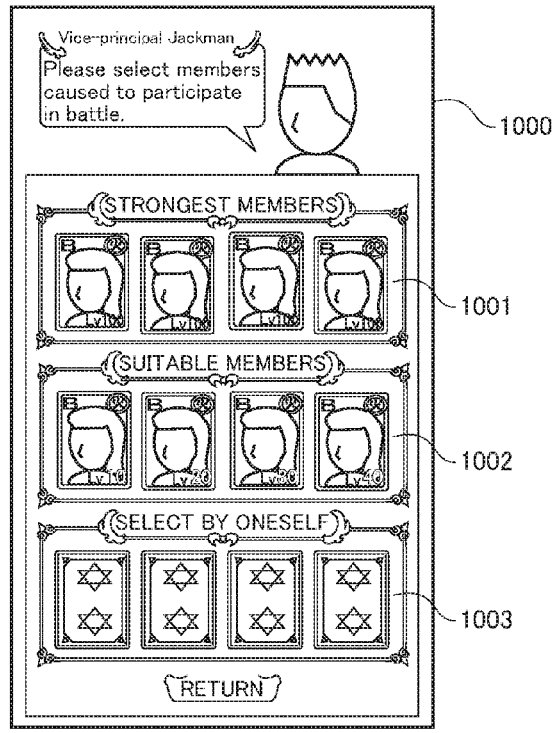
FIG. 10 is an explanatory drawing for explaining an example of a display screen corresponding to at least one of the embodiments according to the present invention.

A user constitutes a deck in a case where an enemy character is displayed. FIG. 10 is an explanatory drawing for explaining an example of the display screen for organizing a deck. As shown in FIG. 10, the deck can be organized by a plurality of patterns. A first input region 1001 in which a deck constituted by the strongest members (hereinafter, referred to the "strongest set") is displayed, a second input region 1002 in which a deck constituted by suitable members (hereinafter, referred to a "recommended set") is displayed, and a third input region 1003 indicating that the user selects by himself or herself are included in a display screen 1000. A set of arcana configuration having the strongest arcanas of the arcanas owned by the user is displayed in the first input region 1001. When an operational input against the first input region 1001 is received, the battle can be carried out by the deck constituted by the arcanas displayed in the first input region 1001 (that is, the strongest set). Further, a set of arcana configuration that is recommended in accordance with strength of the enemy character is displayed in the second input region 1002. When an operational input against the second input region 1002 is received, the battle can be carried out by the deck constituted by the arcanas recommended in accordance with the strength of the enemy character (that is, a recommended set). On the other hand, when an operational input against the third input region 1003 is received, the display screen transitions to a screen in which the arcanas owned by the user are displayed in a list. The user is allowed to select arcanas constituting a deck one by one in the transitioned screen, and the battle can be carried out by the selected arcana configuration.

(Configuration of Recommended Deck)

As described above, a recommended deck is a deck of an arcana configuration according to strength of an enemy character. As an example for organizing the recommended deck, by quantifying the strength of each of the arcanas owned by the user and the strength of the enemy character using a predetermined evaluation formula, a deck constituted by the arcanas each of which theoretically has slightly stronger than the strength of the enemy character is organized. Namely, because of a theoretical manner, in a case where a battle is carried out by the recommended deck, the enemy character is stronger than the deck and the battle may be terminated as defeat of the user. Although a concrete formula will not be described, the predetermined evaluation formula used herein is a formula using various kinds of parameters, such as a level value and an offensive power set up for the character, for example.

(Outline of Game Image During Battle)

Figure 11:
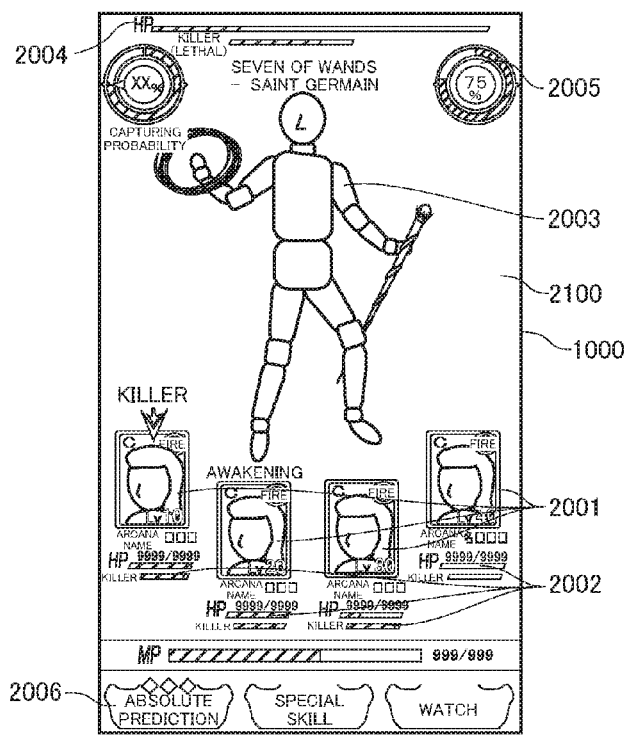
FIG. 11 is an explanatory drawing for explaining an example of a display screen corresponding to at least one of the embodiments according to the present invention.
Figure 15:
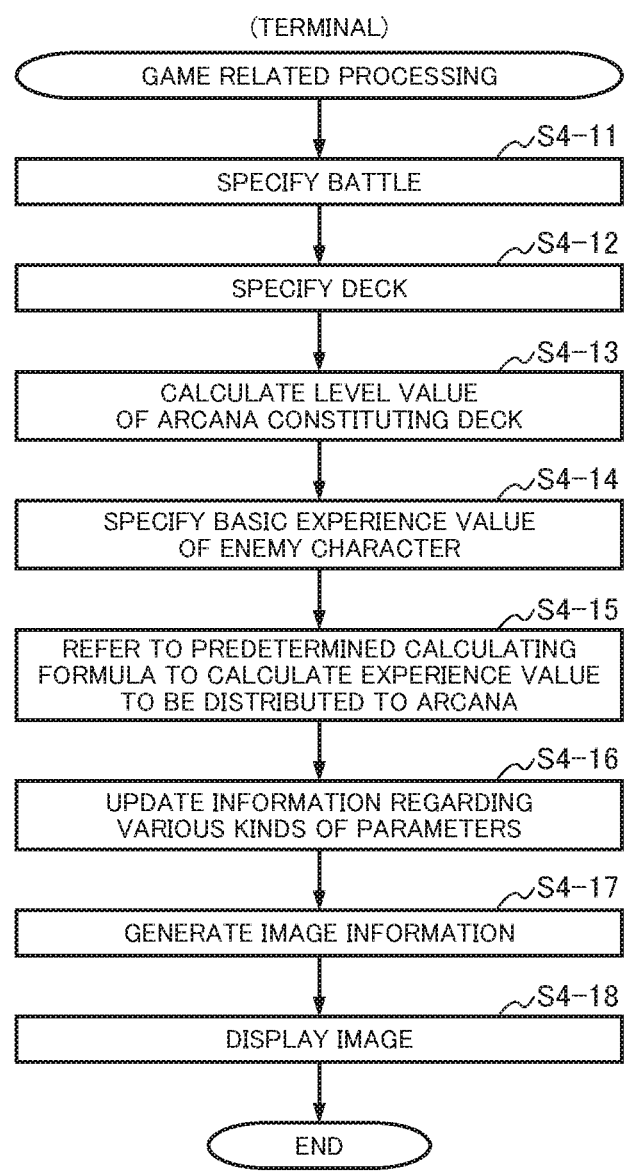
FIG. 15 is a flowchart showing an example of game related processing corresponding to at least one of the embodiments according to the present invention.

FIG. 11 is an explanatory drawing for explaining an example of the display screen for displaying a game image during a battle. As shown in FIG. 15, a game image 2100 during a battle, which includes arcanas 2001 constituting a deck, a status 2002 of each of arcanas, an enemy character 2003, a status 2004 of an enemy character, a victory probability icon 2005, and a prediction (or preperception) button 2006 by which the user can know subsequent development of the battle, is displayed in a display screen 1000.

(Game Image 1 During Battle)

As shown in FIG. 11, the status 2002 of the arcana is contained in the vicinity of each of the arcanas 2001 in the game image 2100 during the battle. The status 2002 of each of the arcanas is subtracted by an action of the enemy character 2003. Although it is not shown in the drawings particularly, the arcana whose HP becomes 0, a display form thereof is changed into a display form by which the user is caused to recognize that the HP thereof is 0. In a case where the HPs of all arcanas become zero, the battle is terminated as defeat of the user.

(Game Image 2 During Battle)

As shown in FIG. 11, the enemy character 2003 is contained at the center of the image in the game image 2100 during the battle. Further, as shown in FIG. 15, the status 2004 of the enemy character is displayed above the enemy character. In a case where the HP of the enemy character becomes "0", the battle is terminated as victory of the user.

(Game Image 3 During Battle)

Figure 12:
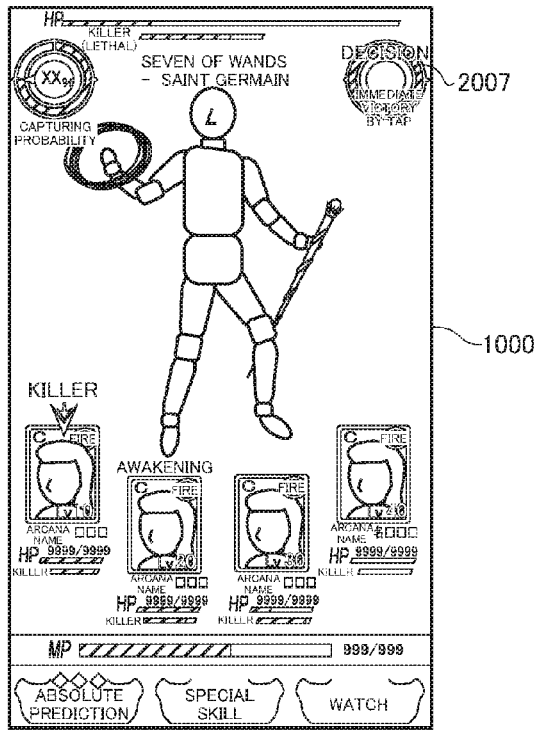
FIG. 12 is an explanatory drawing for explaining an example of a display screen corresponding to at least one of the embodiments according to the present invention.

As shown in FIG. 11, the victory probability icon 2005 is contained in the game image during the battle. A victory probability mentioned herein is displayed as information calculated on the basis of a predetermined calculation formula. However, the victory probability herein is not a victory probability in a strict sense, but is information corresponding to progress of the video game. When it is calculated that the victory probability is 100% on the basis of the predetermined calculation formula, the victory probability icon 2005 is highlighted, and becomes an icon for which an operational input is available. FIG. 12 is an explanatory drawing for explaining an example of the display screen showing that a victory probability icon is highlighted. As shown in FIG. 12, a display form of the victory probability icon 2005 is changed into that of a victory probability icon 2007 indicating decision. In this regard, it has not been shown in FIG. 12 particularly. However, the display form of the victory probability icon 2007 indicating decision has a different color from that of the victory probability icon 2005. Here, when an operational input (for example, a tap input) against the victory probability icon 2007 is received from the user, the battle is terminated, and victory of the user is decided. In this regard, in the present embodiment, battle progress is displayed on the display screen 1000 in a fast forwarding manner until the battle is terminated. The user terminal is configured so that an input from the user is not received while the battle progress is displayed. In this regard, it has not been shown in FIG. 11 particularly. However, in a case where it is calculated that the victory probability is not 100%, an "escape icon" is displayed in the vicinity of the victory probability icon. When an operational input against the "escape icon" is received, the battle is terminated without determining victory or defeat.

(Game Image 4 During Battle)

As shown in FIG. 11, the prediction button (that is, an input region) 2006 capable of receiving an operational input from the user is contained. An operational input against the prediction button 2006 causes the user to make a prediction (or a preperception) for a next action of the enemy character. Here, the prediction means that the user knew in advance. Namely, the user can know what action the enemy character carries out. In this regard, this predicted action is not necessarily carried out with the probability of 100%. A probability that the predicted action is carried out varies in accordance with a progress status of the video game. Here, a prediction that the predicted action is carried out with the probability of 100% is referred to as an "absolute prediction". On the other hand, a prediction that the predicted action is not necessarily carried out with the probability of 100% is referred to as an "automatic prediction". The "absolute prediction" and the "automatic prediction" will be described later in detail.

(As for Calculation of Victory Probability)

As described above, as shown in FIG. 11 or FIG. 12, the victory probability icon 2005 or the victory probability icon 2007 regarding the calculated victory probability is displayed in an image during a battle on the basis of the predetermined calculation formula. In the present embodiment, in order to calculate a victory probability, at the start of a round, the user terminal does not receive any operational input from the user (or assuming that the user terminal receives a predetermined operational input at predetermined timing), but prefetches a result of the battle when the predetermined number of turns elapses. More specifically, at the start of the round, the user terminal automatically causes the arcanas of the user and the enemy character to act on the basis of a "predetermined action rule" until 30 turns are carried out, and internally calculates (or prefetches) a battle result after the 30 turns. In a case where a calculation result that an HP of the enemy character becomes "0" is obtained, the victory probability icon 2007 indicating that the victory probability is 100% is displayed as shown in FIG. 12. On the other hand, in a case where the calculation result that the HP of the enemy character becomes "0" is not obtained, the victory probability icon 2005 indicating a percentage calculated on the basis of a rate of a current HP of the enemy character and the maximum value of the HP of the enemy character is displayed as shown in FIG. 11. Namely, the victory probability icon 2005 does not express the "victory probability" in the strict sense, but expresses how the HP of the enemy character reduces at the present state.

(Skip of Battle)

The victory probability icon 2007 has a function as a region to cause the user to recognize the victory probability and to receive an instruction to skip a battle from the user. In the present embodiment, when an input against the victory probability icon 2007 is received from the user, the battle is terminated as victory of the user. Namely, the vi den game proceeds so that the battle is skipped, and the user can win the battle without requiring a particular operation. In this case, the user terminal may be configured so that the video game according to the present embodiment transitions to a battle result suddenly. Further, when an input against the victory probability icon 2007 is received from the user, then the user terminal does not receive any input from the user until a battle result is displayed (that is, while a battle progress until the battle result is displayed is displayed). Here, the battle progress and the battle result to be displayed is displayed on the basis of calculation information when to internally calculate a battle result at 30 turns future.

(Absolute Prediction)

A usage right of an "absolute prediction" is given to the user with a probability by referring to a "preperceptive power" included in user parameters. The user to which the usage right of the "absolute prediction" carries out an operational input (for example, tap input) against the "absolute prediction icon 2006" displayed on a screen, whereby the user is allowed to use the "absolute prediction". The "absolute prediction" can be used in a "phase for the user". The probability that the usage right of the "absolute prediction" is given is set to be lower than a probability that a usage right of the "automatic prediction" is given.

(Automatic Prediction)

The usage right of the "automatic prediction" is given to the user with a probability by referring to the "preperceptive power" included in the user parameters. In a case where the usage right of the "absolute prediction" is given to the user, the "automatic prediction" is not given to the user. Further, unlike the "absolute prediction", the predicted action is not necessarily carried out. Namely, a hit ratio (or a predictive ratio) of the automatic prediction is not necessarily 100%. The probability that the predicted action is carried out is calculated on the basis of a predetermined calculation formula from the "preperceptive power" included in the user parameters and other factors. Although a concrete calculation formula will not be described, a calculation formula so as to fall into a range of about 50% to 100% is used.

(At Time of Victory of Battle)

Figure 13:
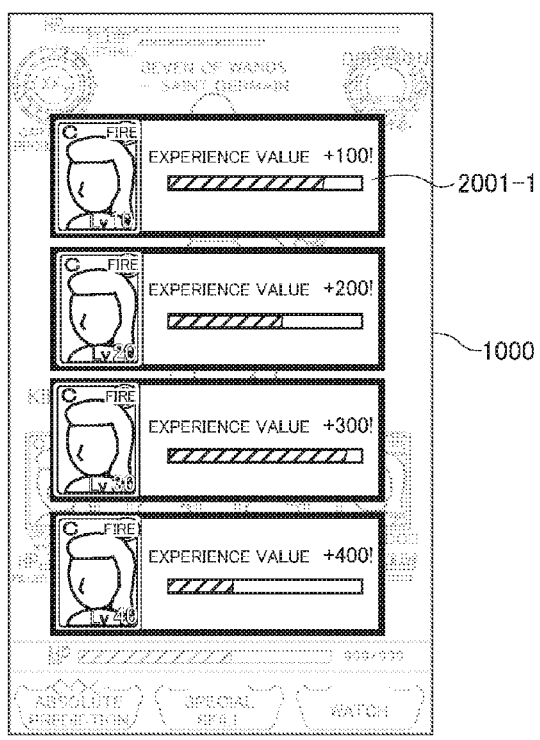
FIG. 13 is an explanatory drawing for explaining an example of a display screen corresponding to at least one of the embodiments according to the present invention.

When the user wins a battle, a display screen transitions to a victory screen. FIG. 13 is an explanatory drawing for explaining an example of the victory screen. As shown in FIG. 13, an experience value is given to each of the arcanas. Namely, the experience value is given to each of the arcanas of the user who participates in the battle on the basis of an experience value associated with the enemy character (hereinafter, referred to as a "basic experience value"). By distributing the basic experience value to the respective arcanas, each of the arcanas obtains the experience value. A rate of the experience value to be given to one arcana is determined in accordance with a rate of a level value of the one arcana to a total level value of the respective arcanas that participate in the battle. As shown in FIG. 13, in a case where a level of an arcana 2001-1 that participates in a battle is "10" and a total level value of the respective arcanas that participate in the battle is "100", a rate of an experience value to be given to the arcana 2001-1 becomes 10%. For example, in a case where a basic experience value associated with the enemy character is "1000", an experience value of "100" is given to the arcana 2001-1 as shown in FIG. 13. Further, in a case where a level of an arcana 2001-2 that participates in a battle is "20" and the total level value of the respective arcanas that participate in the battle is "100", a rate of an experience value to be given to the arcana 2001-2 becomes 20%.

Figure 14:
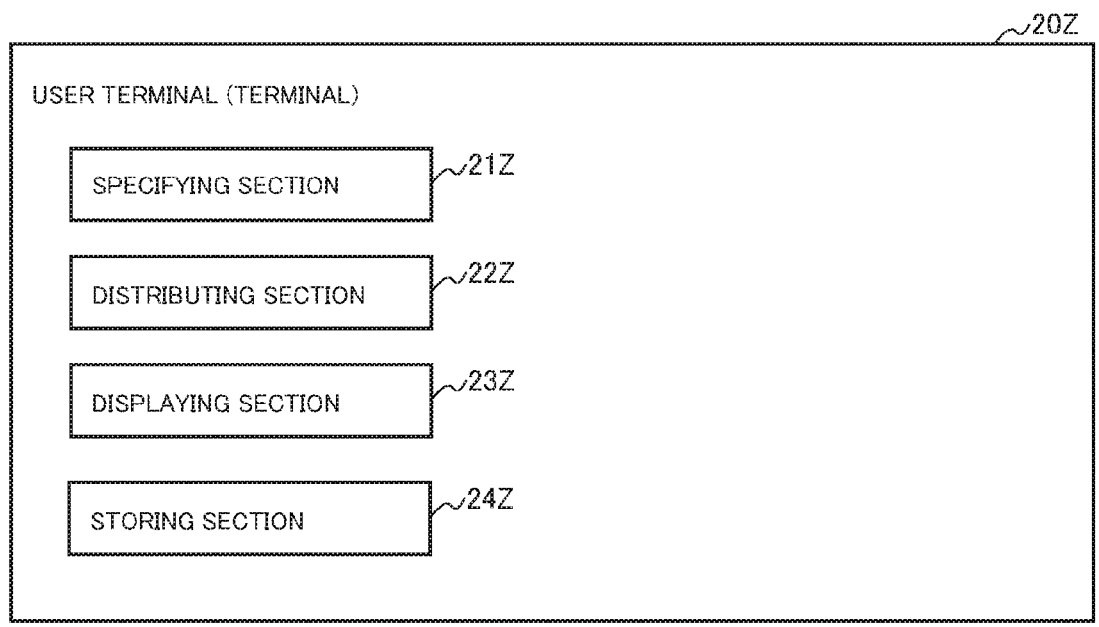
FIG. 14 is a block diagram showing a configuration of the user terminal corresponding to at least one of the embodiments according to the present invention.

FIG. 14 is a block diagram showing a configuration of a user terminal 20Z (hereinafter, referred to as a "terminal 20Z"), which is an example of the user terminal 20 in the system 100 (see FIG. 1).

In the present embodiment, the terminal 20Z refers to a level value set up to the arcana as a parameter to which the terminal 20Z refers at the time of distribution. Further, in the present embodiment, the terminal 20Z is configured so that the higher the level value of arcana is, the higher the distribution factor thereof becomes compared with an arcana having a low level value.

In the present embodiment, the terminal 20Z at least includes a specifying section 21Z, a distributing section 22Z, a displaying section 23Z, and a storing section 24Z.

The specifying section 21Z has a function to specify a battle that was carried out by the user, a deck constituted by a plurality of arcanas, and a basic experience value that is given in accordance with progress of the battle using the constituted deck. More specifically, the specifying section 21Z stores information regarding a selection input of an event in a storage region, such as a memory or the like; refers to the stored information; and specifies the event. Further, the specifying section 21Z stores information regarding a deck organized in accordance with an input to a deck organizing screen as shown in FIG. 10 from the user in the storage region of the memory or the like; refers to the stored information; and specifies the deck. Further, the specifying section 21Z refers to the storing section 24Z, and specifies a parameter of each of arcanas constituting the deck. Moreover, the specifying section 21Z refers to information stored in the storing section 24Z, and specifies a basic experience value of an enemy character that appears in the event.

The distributing section 22Z has a function to distribute a basic privilege to each of a plurality of game elements in accordance with a ratio of a parameter set up to each of the plurality of game elements to a total of the parameters respectively set up to the plurality of game elements. In the present embodiment, the distributing section 22Z has a function to calculate an experience value to be distributed to one arcana included in a set in accordance with the formula (I) as follows:

[Experience value distributed to one arcana]=[Basic experience value]×[Level value of one arcana]/ [Total of level values respectively set up to a plurality of arcanas that constitutes deck].

Further, the distributing section 22Z has a function to give the calculated experience value to one arcana. Further, the distributing section 22Z updates information regarding various kinds of parameters for the arcanas, which are to be stored in the storing unit 24Z, by giving the experience value to each of the arcanas.

In this regard, the "parameter" herein is configured so as to be a level value of an arcana. However, it is preferable that an example of the configuration of the "parameter" is an element that varies in accordance with a privilege to be distributed. In the present embodiment, the experience value is the privilege to be distributed, and the level value as the parameter varies (or rises) in accordance with the experience value to be distributed.

The displaying section 23Z has a function to cause a display device included in the terminal 20Z to display an image, by which the user is caused to recognize information regarding a distribution result, on a display screen thereof. For example, the displaying section 23Z generates image information for displaying an image by which the user is caused to recognize the information regarding the distribution result, and displays the image on the basis of the generated image information.

The storing section 24Z is a storage medium for storing various kinds of information that are used for progress of the video game. Although it has not been shown particularly, information regarding the formula (I), user information, battle information, and the like are stored in the storing section 24Z. A user ID for uniquely specifying the user, information regarding the arcanas owned by the user, information regarding actions set up to the arcanas owned by the user and the various kinds of parameters for the arcanas, and the like are contained in the user information. Further, a battle ID for uniquely specifying a battle, information regarding actions set up to an enemy character that appears in the battle and various kinds of parameters, information regarding a privilege and a basic experience value associated with the enemy character, and the like are contained in the battle information.

FIG. 15 is a flowchart showing an example of the game related processing carried out by the terminal 20. Hereinafter, an operation of the terminal 20Z will be described as an example. In this regard, an operation of the terminal 20Z with the server 10 is omitted from a point of view to avoid repeated explanation. In this regard, the following explanation will be made so that the display device is caused to display information regarding progress of the event on the display screen at fixed intervals.

The game related processing is started when the user wins in a fight against an enemy character, for example.

In the game related processing, the terminal 20Z first specifies the battle that was carried out by the user (Step S4-11). Here, the terminal 20Z specifies a battle in which the enemy character 2003 appears.

Subsequently, the terminal 20Z specifies a deck used in the battle (Step S4-12). Here, the terminal 20Z specifies a deck constructed by the arcana 2001-1, the arcana 2001-2, the arcana 2001-3, and the arcana 2001-4.

Subsequently, the terminal 20Z specifies a level value of each of the arcanas constituting the deck (Step S4-13). Here, as shown in FIG. 13, "10" is specified as the level value of the arcana 2001-1; "20" is specified as the level value of the arcana 2001-2; "30" is specified as the level value of the arcana 2001-3; and "40" is specified as the level value of the arcana 2001-4.

Subsequently, the terminal 20Z specifies the basic experience value associated with the enemy character (Step S4-14). Here, the terminal 20Z specifies "1000" as the basic experience value of the enemy character 2003.

When the various kinds of information are specified, the terminal 20Z refers to the formula (I) to calculate the experience value to be given to each of the arcanas (Step S4-15). In the present embodiment, as shown in FIG. 13, the terminal 20Z calculates the experience value to be distributed to each of the arcanas on the basis of the formula (I). As shown in the following formula, "100" is specified as the experience value to be distributed to the arcana 2001-1:

[Experience value distributed to arcana 2001-1]= [1000]×[10]/[100].

Further, as shown in the following formula, "200" is specified as the experience value to be distributed to the arcana 2001-2:

[Experience value distributed to arcana 2001-2]= [1000]×[20]/[100].

Moreover, as shown in the following formula, "300" is specified as the experience value to be distributed to the arcana 2001-3:

[Experience value distributed to arcana 2001-3]= [1000]×[30]/[100].

Furthermore, as shown in the following formula, "400" is specified as the experience value to be distributed to the arcana 2001-4:

[Experience value distributed to arcana 2001-4]= [1000]×[40]/[100].

When the experience value to be given to each of the arcanas is calculated, the terminal 20Z gives the experience value to each of the arcanas, and updates the information regarding the various kinds of parameters for the arcanas, which are stored in the storing unit 24Z (Step S4-16).

The terminal 20Z then generates image information for causing the user to recognize that the experience value is given to each of the arcanas (Step S4-17).

When the image information is generated, the terminal 20Z causes the display device to display an image on the display screen 1000 on the basis of the generated image information (Step S4-18), and terminates the processing therein. As shown in FIG. 13, an image indicating that the experience value is given to each of the arcanas is displayed on the display screen 1000.

As explained above, as one side of the fourth embodiment, the terminal 20Z for controlling progress of the video game is configured so as to at least include the specifying section 21Z and the distributing section 22Z. Thus, the event in the video game, the set constituted by the plurality of game elements, and the basic privilege to be given in accordance with the result of the event using the set are specified; and the basic privilege is distributed to each of the plurality of game elements in accordance with the ratio of the parameter set up to each of the plurality of game elements to the total of the parameters respectively set up to the plurality of game elements. Therefore, it is possible to improve interest in the video game using the event.

Further, as one side of the fourth embodiment described above, the user terminal 20Z is configured so as to at least include the specifying section 21 and the distributing section 22B. Thus, in comparison of the parameters for the plurality of game elements, the basic privilege is distributed so that the distribution factor of the game element having a higher parameter becomes higher compared with the game element having a lower parameter. Therefore, it is possible to improve interest in the video game using the event.

In this regard, it has not been mentioned particularly in the example of the fourth embodiment described above. However, the terminal 20Z may be configured so as to distribute one obtained by multiplying a predetermined magnification ratio to the basic experience value. For example, the terminal 20Z may be configured so that a special time is set up in the video game and the predetermined magnification ratio is multiplied to the basic experience value in a case where the event is carried out in or during the set time.

In this regard, it has not been mentioned particularly in the example of the fourth embodiment described above. However, the terminal 20Z may be configured so as to give an experience value, which is obtained by being added to the distributed experience value in accordance with a predetermined rule, to a predetermined arcana (that is, the game element). Here, as examples of the configuration of the "predetermined rule", there are a configuration "compatibility with an enemy character has a predetermined relationship", a configuration "it becomes a state that a bonus experience value can be obtained (for example, a state that an item by which the experience value can be obtained twice is used)" and the like.

In this regard, it has not been mentioned particularly in the example of the fourth embodiment described above. However, the terminal 20Z may be configured so as to: determine, before the basic experience value is distributed by the distributing section 22Z, whether a state when to distribute the basic privilege (for example, a state of the user, a state of the deck, a state of the video game, or the like) is a special state or not; distribute the basic privilege to each of the plurality of game elements in accordance with a ratio of the parameter set up to each of the plurality of game elements to the total of the parameters respectively set up to the plurality of game elements in a case where it is determined that the state is not the special state; and distribute the basic experience value to each of the plurality of game elements by using a calculating formula according to the special state in a case where it is determined that the state is the special state. As an example of the configuration of the special state, there is a configuration in which, in a case where the user uses an in-game item for shifting to the special state, the experience value is not distributed in accordance with the level of the game element, but the basic experience value is divided equally and given to each of the game elements, for example. According to such a configuration, a game element having a low level value can obtain the quantity of experience value that the game element cannot obtain normally compared with the level value of other game element. Therefore, it is possible to improve interest in the video game.

In this regard, it has not been mentioned particularly in the example of the fourth embodiment described above. However, the terminal 20Z may be configured so as to: constitute a set by game elements respectively selected by a plurality of players; and distribute the basic experience value to the game element of each of the players by referring to a player level value of each of the players. By configuring the terminal 20Z in this manner, it is possible to prompt the player to consider a level difference with other player when to carry out multiplay.

As explained above, one or two or more shortages can be solved by each of the embodiments according to the present application. In this regard, the effects by of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out apart or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

Further, the program product may be configured so as to cause a single apparatus that does not include a communication network to realize a part or all of the functions that have been explained as the examples of the respective embodiments described above.

(Appendix)

The explanation of the embodiments described above has been described so that the following inventions can be at least realized by a person having a normal skill in the art to which the present invention belongs.

(1)

A non-transitory computer-readable medium including a program product for causing a user terminal to realize functions to control progress of a video game, wherein the functions include:

a specifying function configured to specify an event in the video game, a set, and a basic privilege, the set being constituted by a plurality of game elements, the basic privilege being given in accordance with progress of the event using the set; and a distributing function configured to distribute the basic privilege to the plurality of game elements in accordance with a ratio of a parameter set up to each of the plurality of game elements to a total of the parameters respectively set up to the plurality of game elements.

(2)

The non-transitory computer-readable medium according to claim 1), wherein the distributing function includes a function configured to distribute the basic privilege that in comparison of the parameters for the plurality of game elements, a distribution factor of a game element having a higher parameter becomes higher compared with a game element having a lower parameter.

(3)

The non-transitory computer-readable medium according to claim (1) or (2), wherein the basic privilege is a basic experience value, and wherein the distributing function includes a function configured to calculate an experience value to be distributed to one game element contained in the set in accordance with a formula (I), and give the calculated experience value to the one game element:

[Experience value to be distributed to one game element]=[Basic experience value]×[Parameter of one game element]/[Total value of parameters respectively set up to the plurality of game elements]        (I).

(4)

The non-transitory computer-readable medium according to any one of claims (1) to (3), wherein the basic privilege is a basic experience value, wherein the distributing function includes a function configured to use a level value of each of the plurality of game elements as the parameter, and wherein the level value varies on the basis of an experience value.

(5)

The non-transitory computer-readable medium according to any one of claims (1) to (4), wherein the event includes an enemy character, and wherein a basic experience value is set up to the enemy character.

(6)

The non-transitory computer-readable medium according to any one of claims (1) to (5), wherein the functions further include:

a determining function configured to determine, before the basic experience value is distributed by the distributing function, whether a state when to distribute the basic privilege is a special state or not, and wherein the distributing function includes:

a function configured to distribute the basic privilege to each of the plurality of game elements in accordance with a ratio of the parameter set up to each of the plurality of game elements to the total of the parameters respectively set up to the plurality of game elements in a case where it is determined that the state is not the special state; and a function configured to distribute the basic experience value to each of the plurality of game elements by using a calculating formula according to the special state in a case where it is determined that the state is the special state.

(7)

A non-transitory computer-readable medium including a program product for causing a server to realize at least one function of the functions that the program product described in any one of claims (1) to (6) causes a computer to realize, the server being capable of communicating with the computer.

(8)

A computer into which the program product contained in the non-transitory computer-readable medium according to any one of claims (1) to (7) is installed.

(9)

A system for controlling progress of a video game, the system comprising a communication network, a server, and a user terminal, the system comprising:

a specifying section configured to specify an event in the video game, a set, and a basic privilege, the set being constituted by a plurality of game elements, the basic privilege being given in accordance with progress of the event using the set; and a distributing section configured to distribute the basic privilege to the plurality of game elements in accordance with a ratio of a parameter set up to each of the plurality of game elements to a total of the parameters respectively set up to the plurality of game elements.

(10)

The system according to claim (9), wherein the server includes the specifying section and the distributing section, and wherein the user terminal includes:

a receiving section configured to receive, from the server, information for displaying the image; and a displaying section configured to display the image.

(11)

A non-transitory computer-readable medium including a program product for causing a server to realize functions to control progress of a video game, wherein the functions include:

a specifying function configured to specify an event in the video game, a set, and a basic privilege, the set being constituted by a plurality of game elements, the basic privilege being given in accordance with progress of the event using the set; and a distributing function configured to distribute the basic privilege to the plurality of game elements in accordance with a ratio of a parameter set up to each of the plurality of game elements to a total of the parameters respectively set up to the plurality of game elements.

(12)

A non-transitory computer-readable medium including a program product for causing a user terminal to realize functions to control progress of a video game, wherein a server includes:

a specifying function configured to specify an event in the video game, a set, and a basic privilege, the set being constituted by a plurality of game elements, the basic privilege being given in accordance with progress of the event using the set; and a distributing function configured to distribute the basic privilege to the plurality of game elements in accordance with a ratio of a parameter set up to each of the plurality of game elements to a total of the parameters respectively set up to the plurality of game elements, and wherein the functions include:

a receiving function configured to receive, from the server, information for displaying the image.

(13)

A non-transitory computer-readable medium including a program product for causing a user terminal to realize at least one function of the functions that the program product described in claim (12) causes the server to realize, the user terminal being capable of communicating with the server.

(14)

A server into which the program product contained in the non-transitory computer-readable medium according to claim (12) is installed.

(15)

A method of controlling progress of a video game, the method comprising:

a specifying process configured to specify an event in the video game, a set, and a basic privilege, the set being constituted by a plurality of game elements, the basic privilege being given in accordance with progress of the event using the set; and a distributing process configured to distribute the basic privilege to the plurality of game elements in accordance with a ratio of a parameter set up to each of the plurality of game elements to a total of the parameters respectively set up to the plurality of game elements.

(16)

A method of controlling progress of a video game by means of a system, the system including a communication network, a server, and a user terminal, the method comprising:

a specifying process configured to specify an event in the video game, a set, and a basic privilege, the set being constituted by a plurality of game elements, the basic privilege being given in accordance with progress of the event using the set; and a distributing process configured to distribute the basic privilege to the plurality of game elements in accordance with a ratio of a parameter set up to each of the plurality of game elements to a total of the parameters respectively set up to the plurality of game elements.

According to one of the embodiments of the present invention, it is useful for a video game using an event.

What is claimed is:

1. A non-transitory computer-readable medium including a program product for causing a user terminal to realize functions to control progress of a video game, wherein the functions include:

a specifying function configured to specify an event in the video game, a set, and a basic privilege, the set being constituted by a plurality of game elements, the basic privilege being given in accordance with progress of the event using the set;

a distributing function configured to distribute the basic privilege to the plurality of game elements in accordance with a ratio of a parameter set up to each of the plurality of game elements to a total of the parameters respectively set up to the plurality of game elements; and a victory probability icon function configured to display a victory probability icon on a display screen of the user terminal during the event, the victory probability icon showing a victory probability for the event by a user of the user terminal, wherein, when the victory probability is 100%, the victory probability icon becomes an icon for which an operational input is available, and wherein, when the operational input is input to the victory probability icon, the event is displayed in a fast forwarding manner until the event is terminated.

2. The non-transitory computer-readable medium according to claim 1, wherein the distributing function includes a function configured to distribute the basic privilege so that in comparison of the parameters for the plurality of game elements, a distribution factor of a game element having a higher parameter becomes higher compared with a game element having a lower parameter.

3. The non-transitory computer-readable medium according to claim 1, wherein the basic privilege is a basic experience value, and wherein the distributing function includes a function configured to calculate an experience value to be distributed to one game element contained in the set in accordance with a formula (I), and give the calculated experience value to the one game element:

[Experience value to be distributed to one game element]=[Basic experience value]×[Parameter of one game element]/[Total value of parameters respectively set up to the plurality of game elements]    (I).

4. The non-transitory computer-readable medium according to claim 1, wherein the basic privilege is a basic experience value, wherein the distributing function includes a function configured to use a level value of each of the plurality of game elements as the parameter, and wherein the level value varies on the basis of an experience value.

5. The non-transitory computer-readable medium according to claim 1, wherein the event includes an enemy character, and wherein a basic experience value is set up to the enemy character.

6. The non-transitory computer-readable medium according to claim 1, wherein the functions further include:

a determining function configured to determine, before the basic experience value is distributed by the distributing function, whether a state when to distribute the basic privilege is a special state or not, and wherein the distributing function includes:

a function configured to distribute the basic privilege to each of the plurality of game elements in accordance with a ratio of the parameter set up to each of the plurality of game elements to the total of the parameters respectively set up to the plurality of game elements in a case where it is determined that the state is not the special state; and a function configured to distribute the basic experience value to each of the plurality of game elements by using a calculating formula according to the special state in a case where it is determined that the state is the special state.

7. A computer into which the program product contained in the non-transitory computer-readable medium according to claim 1 is installed.

8. A non-transitory computer-readable medium including a program product for causing a server to realize functions to control progress of a video game, wherein the functions include:

a specifying function configured to specify an event in the video game, a set, and a basic privilege, the set being constituted by a plurality of game elements, the basic privilege being given in accordance with progress of the event using the set; and a distributing function configured to distribute the basic privilege to the plurality of game elements in accordance with a ratio of a parameter set up to each of the plurality of game elements to a total of the parameters respectively set up to the plurality of game elements; and a victory probability icon function configured to display a victory probability icon on a display screen of a user terminal during the event, the victory probability icon showing a victory probability for the event by a user of the user terminal, wherein, when the victory probability is 100%, the victory probability icon becomes an icon for which an operational input is available, and wherein, when the operational input is input to the victory probability icon, the event is displayed in a fast forwarding manner until the event is terminated.

9. A non-transitory computer-readable medium including a program product for causing a user terminal to realize functions to control progress of a video game, wherein the functions include:

a specifying function configured to specify an event in the video game, a set, and a basic privilege, the set being constituted by a plurality of game elements, the basic privilege being given in accordance with progress of the event using the set; and a distributing function configured to distribute the basic privilege to the plurality of game elements in accordance with a ratio of a parameter set up to each of the plurality of game elements to a total of the parameters respectively set up to the plurality of game elements, and for each of the plurality of game elements, a distribution factor of the basic privilege decreases in accordance with an increase in the ratio of the parameter.

* * * * *